(12) United States Patent
Zhong et al.

(10) Patent No.: US 9,616,794 B2
(45) Date of Patent: Apr. 11, 2017

(54) FRAME ASSEMBLY OF MOVEABLE STOWAGE DEVICE AND ITS APPLICATION AS A TRANSPORT VEHICLE

(75) Inventors: Kai Zhong, Shanghai (CN); Yanping Liu, Shanghai (CN); Laihui Zhang, Shanghai (CN); Jiayan Huang, Shanghai (CN); Weiping Lu, Shanghai (CN)

(73) Assignee: CN-NL WASTE SOLUTION CO., LTD, Shanghai (CN)

( * ) Notice: Subject to any disclaimer, the term of this patent is extended or adjusted under 35 U.S.C. 154(b) by 229 days.

(21) Appl. No.: 13/808,788

(22) PCT Filed: Dec. 12, 2011

(86) PCT No.: PCT/CN2011/002066
§ 371 (c)(1),
(2), (4) Date: Mar. 3, 2014

(87) PCT Pub. No.: WO2013/067663
PCT Pub. Date: May 16, 2013

(65) Prior Publication Data
US 2014/0234061 A1    Aug. 21, 2014

(30) Foreign Application Priority Data

Nov. 10, 2011   (CN) .......................... 2011 1 0353931

(51) Int. Cl.
*B60P 1/22*    (2006.01)
*B60P 1/36*    (2006.01)

(52) U.S. Cl.
CPC .. *B60P 1/22* (2013.01); *B60P 1/36* (2013.01)

(58) Field of Classification Search
CPC ...... B60P 1/06; B60P 1/22; B60P 1/36; B62D 21/00
USPC .................................................. 414/492, 494
See application file for complete search history.

(56) References Cited

U.S. PATENT DOCUMENTS

| | | | | |
|---|---|---|---|---|
| 4,081,094 A | * | 3/1978 | Pereira ...................... | B60P 1/38 198/310 |
| 4,889,464 A | * | 12/1989 | Self ...................... | B60P 1/6427 298/14 |
| 5,505,580 A | * | 4/1996 | Alstad ...................... | B60P 1/08 414/499 |
| 6,354,787 B1 | * | 3/2002 | O'Daniel .............. | B60P 1/6454 414/494 |
| 6,394,735 B2 | * | 5/2002 | Hollinrake ................ | B60P 1/16 414/489 |

(Continued)

*Primary Examiner* — Kaitlin Joerger
(74) *Attorney, Agent, or Firm* — CBM Patent Consulting, LLC (57) ABSTRACT

The present invention discloses a frame assembly of movable stowage device and its application as a transport vehicle. The frame assembly moving stowage comprises a frame, a rolling chute, a drive sprocket, a driven sprocket, a transmission chain, a towing hook device, a towing hook guide-rail and a power device. The frame assembly can be used to load and unload a dustbin with a transfer vehicle. No special lifting equipment is required when the frame assembly is used. The automatic and modern transport vehicle of present invention makes the transportation of garbage faster and more efficient, which meets the desired requirements of logistics for the transportation of garbage.

10 Claims, 9 Drawing Sheets

(56) References Cited

U.S. PATENT DOCUMENTS

| | | | | |
|---|---|---|---|---|
| 8,029,228 B2* | 10/2011 | Marmur | ................ | B60P 1/6454 |
| | | | | 280/400 |
| 8,465,246 B2* | 6/2013 | Duell | .................... | B60P 1/6463 |
| | | | | 414/480 |
| 8,961,097 B2* | 2/2015 | Doron | .................. | B60P 1/6454 |
| | | | | 414/482 |
| 9,004,842 B2* | 4/2015 | Downing | .............. | B60P 1/6454 |
| | | | | 414/494 |
| 2003/0077157 A1* | 4/2003 | Smith | .................... | B60D 1/145 |
| | | | | 414/491 |
| 2004/0075264 A1* | 4/2004 | Nommensen | .......... | B62D 21/00 |
| | | | | 280/781 |
| 2009/0058133 A1* | 3/2009 | Stolfe | ...................... | B05D 7/54 |
| | | | | 296/182.1 |
| 2014/0369797 A1* | 12/2014 | Jones | .................. | B60P 1/6454 |
| | | | | 414/494 |

* cited by examiner

FRAME ASSEMBLY OF MOVEABLE STOWAGE DEVICE AND ITS APPLICATION AS A TRANSPORT VEHICLE

TECHNICAL FIELD OF THE INVENTION

The invention relates to a frame assembly of a transport vehicle, specifically to the frame assembly of a semitrailer used for transporting two dustbins.

BACKGROUND OF THE INVENTION

Due to the restrictions of usable area, avoidance of the secondary pollution and other reasons, city garbage transfer stations need to use a vertical-type garbage container. The patent literature of publication number CN201437459U discloses its technology proposal. In order to transship this garbage container or the like of stowage, a special truck is needed to be equipped.

Currently, a published dedicated frame assembly of a transport vehicle is equipped with a turnover mechanism and a wire pulling mechanism. When the turnover mechanism is loaded, it will be lift to be in the maximum angle; the pulling mechanism pulls the dustbin to the turnover mechanism, and the turnover mechanism is dropped and placed the dustbin on the frame. When it is unloaded, the turnover mechanism lifts the dustbin to be in the maximum angle, and the pulling mechanism pulls the dustbin to be vertically placed on the ground. However, this vehicle can only transport one dustbin each time; that is, unit-transport cost is high while the transport efficiency is low. To solve the aforementioned transport defects, the patent literature of publication No. CN201436226U discloses a full-trailer type dustbin transport vehicle. According to its technical proposal, it mainly comprises a frame body, a roller shaft of a rolling chute symmetrically distributed on the frame and used for forming a stroke of loading and unloading the dustbin, a pulling bar fixed on a bogie and used for connecting a limber and steering, a stopper positioned at the front section of the frame assembly and used for positioning the dustbin, and a safety locking pin positioned on the back end of the frame assembly and used for locking the dustbin. Through the abovementioned special vehicle of which the back part is additionally hanged with this full trailer and forms a co-train type, two dustbins can be transferred and transported at each time, increasing transport efficiency. However, a single-tank transport vehicle (the bogie) and the full transport vehicle (the rear) have many security risks as they have connection type of pulling a bar, which is prone to have security incidents. Therefore, many countries, including China, have banned using this co-train-style mode of transport.

The patent literature of publication No. CN201436226U also discloses a method of using this full-trailer transport vehicle to load and unload the dustbin. Specifically, when loading, a transit vehicle and the rear part of the full trailers vehicle are in butt joint; a turnover mechanism of the transit vehicle lifts the dustbin to be in a certain angle and facilitates the dustbin to fully slid into tracks of the full-trailer vehicle, and the transit vehicle moves forward and reverses to slowly push the dustbin into the full-trailer vehicle again. When unloading, the transit vehicle and the rear part of the full trailers vehicle are in butt joint; the turnover mechanism is lifted, and the dustbin is raised slowly by the pulling mechanism of the transit vehicle and pushed into the full-trailer vehicle to be transported away.

In order to solve two aforementioned defects of the prior art, the skilled in the art can easily think of using a semi-trailer of a long frame as a transport tool to meet the requirements of transporting two dustbins at the same time. However, as the dustbin is very heavy, it usually needs to be equipped with a separate assembled tool; for example, the dustbin can be loaded and unloaded only through a crane, which is very convenient, has low automation, and is not suitable for logistics requirements for fast and efficient garbage transport.

Combining the abovementioned defects of the prior art, the skilled in the art shall know how to load and unload two dustbins on the same frame (semitrailer) conveniently and rapidly, which is the technical problem needed to be solved.

SUMMARY OF THE INVENTION

As to the abovementioned defects and the technical problem of the prior art, the primary solution of the invention is to disclose a frame assembly of moveable stowage device. The frame assembly utilizes the prior transit vehicle as a loading and unloading tool to load and unload the dustbin and the like stowage, conveniently and rapidly.

The technical proposal adopted by the invention to solve the above technical problems is that: a frame assembly of moveable stowage device comprises a frame, a rolling chute, a drive sprocket, a driven sprocket, a transmission chain and a towing hook device, wherein the rolling chute is mounted on the frame axisymmetrically; the drive sprocket and the driven sprocket are mounted on the frame axially; the drive chain is meshed with the drive sprocket and the driven sprocket, respectively, and the towing hook device is mounted between a drive sprocket group and a driven sprocket group and towed by the transmission chain.

Technical effects of the invention are that: The invention is specially designed for transporting a vertical-type dustbin container or the like stowage device. The inventor shall take full account into the particularities of this dustbin, for example, it has a large dustbin volume; it can be vertically placed and greatly saves floor space, etc. However, this dustbin is very heavy and then is very difficult to be moved, loaded and unloaded. The towing device, which is mounted in the axial direction of the semi-trailer frame loading two dustbins, assembled with the drive and the driven sprockets, the transmission chains and a towing hook, and driven by a motor, can place the transit vehicle in the first dustbin of the rolling chute of the frame and move it along the frame backward or forward. Therefore, the problem, in which the transit vehicle places the second dustbin into or pulls it away from the semi-trailer, can be solved. The technical object, in which two dustbins or the like stowage device can be loaded and unloaded conveniently and rapidly, can be realized. Therefore, in the case of full use of the prior resources, the invention not only saves the cost but also has high automation and meets the logistics requirements of fast and convenient transport of garbage.

The preferred technical proposal is that: the frame assembly further comprises towing hook rails axially mounted on the frame and fitted with the movement tracks, forming moving rails of the towing hook device.

Further technical effects are that: The towing hook device itself has a relatively large weight; the towing hook device cannot be guaranteed to be moved smoothly only by the pulling force of the transmission chains; the towing hook rails are mounted so that they can support the towing hook device and facilitates it to be moved smoothly and reach the precise predetermined stroke positions. Furthermore, the loading bearing of the driven chain can be reduced under static conditions.

The preferred technical proposal is that: The frame assembly also comprises a tensioner fixed on the frame and fixedly connected with the free end of the transmission chains.

The further technical effects are that: The tensioner is increased so as to be able to conveniently adjust the tension of the transmission chain.

The preferred technical proposal is that: The frame assembly also comprises a motor, of which an output shaft is connected with the drive sprocket.

The further technical effects are that: An increased motor device can be powered by a headstock and hence conveniently drives the towing hook device; otherwise, it can be driven only by an externally-connected motor, which improves automation.

The preferred technical proposal is that: The drive sprocket of the frame assembly also comprises a lateral plate, a transmission shaft and a subsidiary sprocket; the left and the right lateral plates are symmetrically mounted and have support effect; the transmission shaft is rotatably provided between the lateral plates; the drive sprocket is sleeved thereon, and the subsidiary sprocket is mounted between the lateral plates below the drive sprocket.

The further technical effects are that: The subsidiary sprocket is additionally mounted below the drive sprocket, thereby facilitating a transmission chain to form a bending here, and hence preventing the transmission chain from occurring interference because of inadequate separation distance.

The preferred technical proposal is that: The driven sprocket of the frame assembly also comprises a driven lateral plate; the left and the right of subsidiary lateral plates are symmetrically mounted and have support effect, and the driven sprocket is mounted between the subsidiary lateral plates.

The preferred technical proposal is that: The towing hook device comprises a bracket, a front towing hook and a back towing hook; the tensioner is provided at one end of the bracket axially, and the front towing hook protrudes, is provided on the bracket and mounted with the back towing hook along the bracket axiasymmetrically.

The further technical effects are that: As one embodiment of the invention, because the different designs of the towing hook device, the winding method of the transmission chain is facilitated to be changed. One free end of the transmission chain of the embodiment is fixed with the tensioner and then winds the drive sprocket and the driven sprocket in sequence, and the other free end of the transmission chain is fixedly connected with the other end of the towing hook device, thereby forming an integral single chain structure. The device has a simple and reliable structure and easy assembly.

The preferred technical proposal is that: A towing hook device of a frame assembly comprises a bracket, a tensioner, a back towing hook and a right sprocket; the two ends of the bracket are provided with the tensioner and the right sprocket respectively. The front towing hook is provided on the bracket and bulgingly mounted with the back towing hook along the bracket axiasymmetrically.

The further technical effects are that: As one of embodiments of the invention, compared with the previous embodiments, this embodiment has the following changes: the right end of the towing hook device is provided with the sprocket; after a transmission chain and the right sprocket are meshed, they constitutes a double-chain structure at the right side of the towing hook device. Therefore, compared with the previous embodiment, such towing dustbin is towed stably, with labor saving and improved structure strength of the towing device.

The preferred technical proposal is that: A towing hook device of a frame assembly comprises a bracket, a back towing hook and a left sprocket; the left sprocket is provided at the left end of the bracket axially, and the front towing hook protrudes, is provided on the bracket, and is mounted together with the back towing hook along the bracket, axially and symmetrically.

The further technical effects are that: As one of the embodiments of the invention, compared with the previous embodiments, this embodiment has the following changes: the end of the towing hook device is provided with the sprocket; after the transmission chain and the tensioner fixedly connected on the frame are connected, they are winds the left sprocket, a drive sprocket and a driven sprocket. Therefore, they constitute a double-chain structure at the left side of such towing device. Hence, a dustbin is towed stably, with labor saving and improved structure strength of the towing device.

The preferred technical proposal is that: A towing hook device of a frame assembly comprises a bracket, a left sprocket, a right sprocket, a front towing hook and a back towing hook; the left and the right sprockets are provided at the two ends of the bracket axially; the front towing hook protrudes, is provided on the bracket close to the end of the left sprocket, and is mounted together with the back towing hook along the bracket, axiasymmetrically.

The further technical effects are that: As one of embodiments of the invention, compared with the previous three embodiments, this embodiment has the following changes: the two ends of the towing hook device are provided with the sprocket. One free end of the transmission chain and the tensioner at the front end of the frame are fixedly connected, and the other free end thereof and one end of the driven sprocket are fixedly connected. With the skillful utilization of the Pulley Principle, a double-chain structure is constituted. Compared with the previous three embodiments, a dustbin is towed more stably, with labor saving and improved structure strength of the integral device.

The preferred technical proposal is that: A towing hook device of a frame assembly also comprises a back towing hook shaft; the back towing hook shaft is sleeved in a bracket axially, and the back towing hook is sleeved thereon; the back towing hook is constituted by an upper shift arm and a lower shift arm which are fixedly connected into L-shape, and hence, after the sleeving, a shaft hole of the back towing hook shaft is opened and mounted on the lower shift arm.

The further technical effects are that: A back towing hook is rotatably sleeved on the shaft, so that it can be automatically reversed and does not prevent a safety beam of a dustbin from entering and being between a front towing hook and a back towing hook, when the beam enters and is between the front towing hook and the back towing hook.

The preferred technical proposal is that: Towing hook rails of a frame assembly consist of two smooth long angle steels mounted in parallel, and a hook-avoidance groove of the towing hook rails is opened and mounted at predetermined stroke of the towing device.

The further technical effects are that: A hook-avoidance groove is designed so that a back towing hook can be reversed by its gravity and a safety beam can be conveniently moved in or out from the safety beam.

The preferred technical proposal is that: A frame of a frame assembly is also mounted with guide wheels; the guide wheels comprise guide-wheel lateral plates and a chain guide roller; the guide-wheel lateral plates are mounted in parallel and has support effect, and two chain guide rollers are mounted between the guide-wheel lateral plates.

The further technical effects are that: The guide wheels are mounted to be beneficial to prevent a transmission chain from skipping and tying a knot, facilitating a towing device to be operated smoothly.

The preferred technical proposal is that: A frame of a frame assembly is also mounted with a stroke switch used for controlling the operation of a motor.

The further technical effects are that: When a towing hook device or a dustbin operates to the predetermined position, it can touch a stroke switch so as to control a motor to stop its operation, reducing cumbersome manual control.

The invention provides a method of using this frame assembly as follows: loading steps: S1: stating a motor and driving a towing hook device to be operated at the maximum stroke or the predetermined stroke of the back end of the frame while guaranteeing a back towing hook to be under turnover conditions; S2: facilitating the rear of a transit vehicle loaded with a first dustbin to be in butt joint with the rear of the frame, placing the dustbin into and being in parallel with a rolling chute of the frame; S3: backing the transit vehicle, pushing the dustbin into the frame along the rolling chute until a safety beam of the dustbin is positioned between a front towing hook and a back towing hook, starting the motor, and towing the dustbin through the towing hook device to the front end of the frame until meeting a retention device; S4: repeating S2 through the transit vehicle loaded with a second dustbin, backing the transit vehicle, and pushing the dustbin into the frame along the rolling chute until meeting the first dustbin; unloading steps: S1: facilitating the rears of the transit vehicle and the frame to be in butt joint, and towing the second dustbin into the transit vehicle through the transit vehicle and transport the second dustbin away; S2: starting the motor and towing the dustbin to the maximum stroke or the predetermined stroke of the back end of the frame through a towing hook device while guaranteeing a back towing hook to be under turnover state without pressure; S3: facilitating the rears of the transit vehicle and the frame to be in butt joint, and towing the first dustbin into the frame and transporting the first dustbin away through the transit vehicle.

The further technical effects are that: The invention fully utilizes the prior resources and loads and unloads two dustbins conveniently and rapidly.

The invention then solves a technical problem to provide a safe transport tool with high transport efficiency. Its technical proposal is that: The transport tool comprises a motor headstock and a travelling mechanism. The back end of the motor headstock is provided with a frame assembly of moveable stowage device, and the length of the frame assembly is matched with the requirements that two dustbins are transported as the same time.

The technical effects of the transport tool are that: This transport tool is a semi-trailer transport vehicle, solving the problem of the low security of a co-train type drive in the prior art, meeting the requirements that two dustbins are transported at the same time, increasing transporting efficiency of a unit vehicle, transferring the dustbin through the matching with a transit vehicle conveniently and rapidly, having high automation, and greatly meeting the logistics requirements of transporting garbage rapidly and efficiently.

DRAWINGS OF THE INVENTION

1. Frame; 11. Rolling Chute; 13. Hook; 14. Retention Device; 15. Traction Pin; 16. Pneumatic Locking Device;
10. Guide Wheels; 101. Guide-Wheel Lateral Plate; 102. Guide-Chain Roller; 103. Guide-Wheel Base Plate;
20. Drive Sprocket; 21. Lateral Plate; 22. Transmission Shaft; 24. Subsidiary Sprocket; 25. Splined Sleeve.
30. Driven Sprocket; 31. Driven Lateral Plate; 33. Base Plate;
4. Transmission Chain
50. Towing Hook Device; 51. Bracket; 52. Left Sprocket; 53. Right Sprocket; 54. Front Towing Hook; 55. Back Towing Hook; 56. Tensioner.
57. Back Towing Hook Shaft; 58. Bolt Base; 521. Bracket Body; 551. Upper Shift Arm; 552. Lower Shift Arm; 553. Back Hook Shaft Hole
60. Towing Hook Guide Rails; 61. Hook-Avoidance Groove; 62. Lower Base Plate; 63. Upper Base Plate; 64. End Plate
70. Motor
80. Stroke Switch

EMBODIMENTS OF THE INVENTION

Combining the drawings, the embodiments of the invention shall be described in details. The advantages of the invention and the outstanding contributions related to the prior art shall further be described.

Embodiment 1

Figure 1:
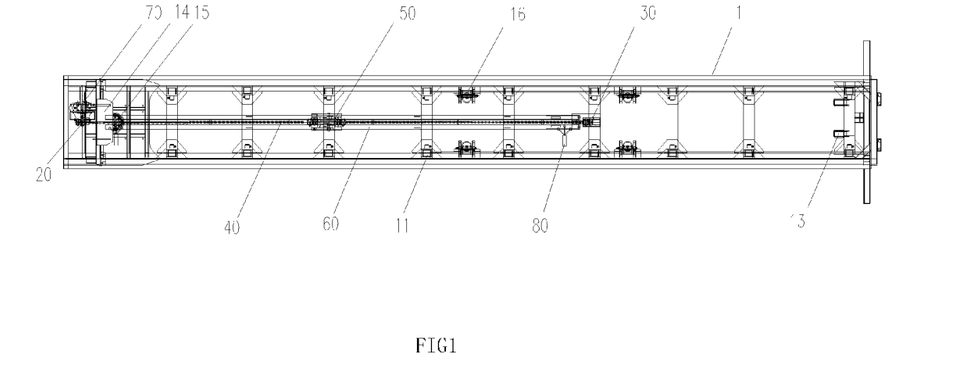
FIG. 1 is a structure diagram under overlooking state according to the invention.

As shown in FIG. 1, a frame assembly mainly comprises a frame 1, a rolling chute 11, a drive sprocket 20, a driven sprocket 30, a transmission chain 40, a towing hook device 50, a motor 70, towing guide rails 60, a stroke switch 80, a hook 13, a retention device 14, a pneumatic locking device 16 and a traction pin 15. The frame 1 is a frame body constituted by an H-shaped beam mounted between a stomach-type H-shaped beam at two sides thereof and the stomach-type H-shaped beam in parallel. The length of the frame body meets the requirements that two vertical type garbage containers are transported. Two protruding hooks 13 are fixed at the H-shaped beam at the rear of the frame 1 and used for hooking a safety beam of the garbage container when the dustbin is placed in a transit vehicle. A retention device 14 is fixed at the H-shaped beam of the front end of the frame 1 and used for positioning a first dustbin. A plurality of rolling wheels are welded at the H-shaped beam symmetrically, hence constitutes a rolling chute 2 distributed at the frame 1 axisymmetrically, and are used for forming the stroke of the dustbin. Four pneumatic locking devices 16 are respectively welded at the lateral wall of the stomach-type H-shaped beam and used for transporting a locked dustbin on the way. The two stroke switches 80 are respectively mounted at the side close to the retention device 14 and a driven sprocket 30 and used for controlling the work of a motor. The motor 70 adopts a motor and an oil pump (not shown) connected through an oil pipe. The power unit of the invention can also use an electric motor, etc.

Figure 2:
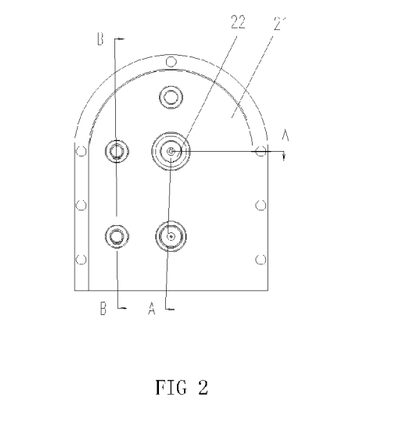
FIG. 2 is a front view of a drive sprocket according to the invention.
Figure 3:
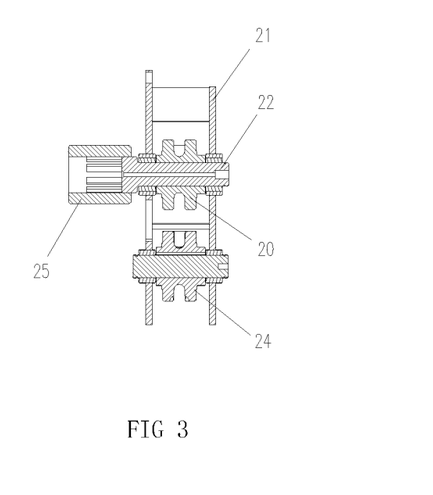
FIG. 3 is an A-A sectional view of FIG. 2.

As shown in FIGS. 2 and 3, the left and the right plates 21 are mounted in parallel, have support effect and mounted in the axis position at the gooseneck of a front end of a frame 1. The two pairs of big shaft holes and three pairs of small shaft holes are opened and mounted on the lateral plate 21 and welded with a sleeve correspondingly, wherein the biggest shaft hole at the upper end is used for mounting a transmission shaft 22. A drive sprocket 20 is sleeved on the transmission shaft 22 through a flat key. The extending end of the transmission shaft 22 is welded with a splined sleeve 25 and used for fixedly connected with an output shaft of a motor 70. One pin is mounted at the big shaft hole below a drive sprocket 20. A subsidiary sprocket 24 can be rotatably sleeved thereon. In such design, the transmission chain 40 forms a bending with a distance between the drive sprocket 20 and the subsidiary sprocket 24, preventing the transmission chain 40 from occurring mutual interference because of inadequate separation distance. Three small shaft holes are respectively mounted with a small pin, and a guide chain roller is sleeved thereon and forms a guide chain device, thereby being used for settling the transmission sprocket 40 and facilitating the transmission chain 40 to be in and out of the drive sprocket 20 and the subsidiary sprocket 24 smoothly. A dust cover is fixed between the lateral plates and used for preventing dust from entering.

Figure 4:
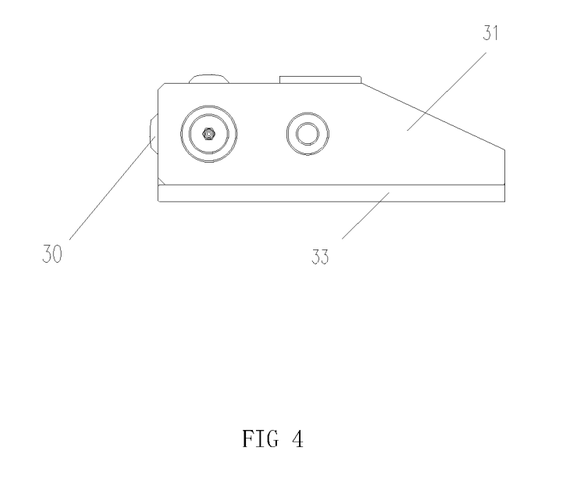
FIG. 4 is a front view of a driven sprocket according to the invention.
Figure 5:
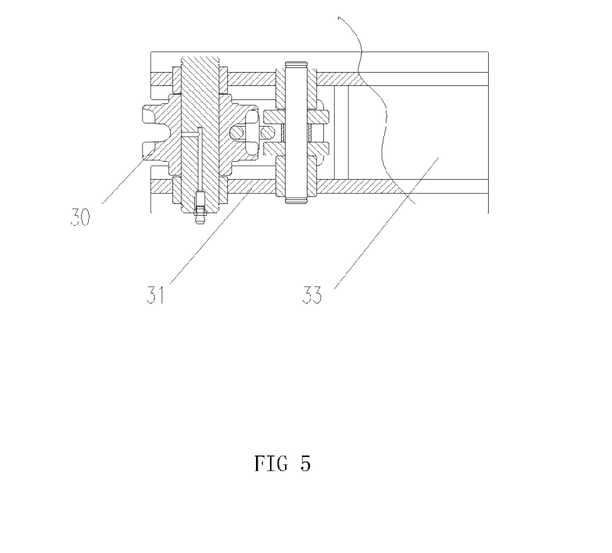
FIG. 5 is a part sectional view under overlooking state of a driven sprocket according to the invention.

As shown in FIGS. 4 and 5, a subsidiary lateral plate 31 is mounted on the left and the right sides of a base plate 33 in parallel, forms a support frame of the driven sprocket 30, and is welded at an H-shaped beam at the middle-shaft place of the middle and rear of the frame. A big shaft hole and a small shaft hole are opened and mounted on a subsidiary lateral plate 31 and welded with a sleeve correspondingly, and two pin shafts are mounted thereon. A driven sprocket 30 is sleeved on a pin shaft of a front big shaft hole. A guide-chain roller is sleeved on a shaft hole and used for guaranteeing the transmission chain 40 to be in and out of the driven sprocket 30 smoothly. The mounting position of the driven sprocket 30 is the maximum stroke position of a towing device 50. Therefore, when a first garbage container is pushed into a rolling chute 11 by a transit vehicle, a safety beam can be guaranteed to reach the place between a front towing hook 54 and a back towing hook 55.

Figure 6:
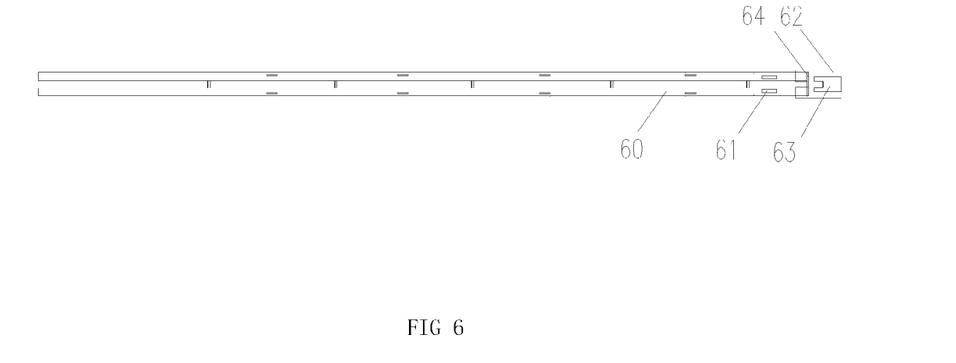
FIG. 6 is a plan view of towing hook guide rails according to the invention.

As shown in FIG. 6, two long angle steels with smooth end surfaces are welded on an H-shaped beam, extend from a drive sprocket 20 to a driven sprocket 30 and hence constitutes movable towing guide rails 60 supporting a towing hook device 50. A plurality of short angle steels are welded below two long angle steels and used for guaranteeing the separation distance between two long angle steels in the width direction. A lower base plate 62 is welded at the end of two long angle steels, which is close to the rear of a frame. The lower base plate 62 is welded on the H-shaped beam. An end plate 64 is vertically welded on the lower base plate 62 and used for limiting the maximum stroke of the towing hook device 50. A through hole is opened and mounted at the corresponding place for a transmission chain 40 to be passed through. An upper base plate 63 is welded on the lower base plate 62 and used for adjusting the highness of a driven sprocket 30 welded on the upper base plate 63. At the maximum-stroke place of the towing hook device 50, two hook-avoidance grooves 61 are opened and mounted at the place of the long angle steel corresponding to two back towing hooks 55, so that a towing hook 55 can be overturned depending on its gravity at the place.

Figure 7:
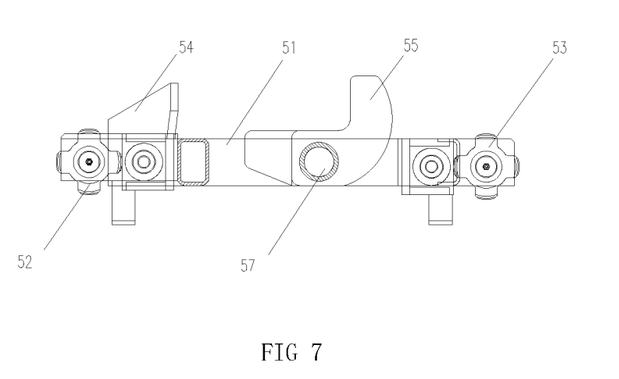
FIG. 7 is a front view of a towing hook device according to Embodiment 1 of the invention.
Figure 8:
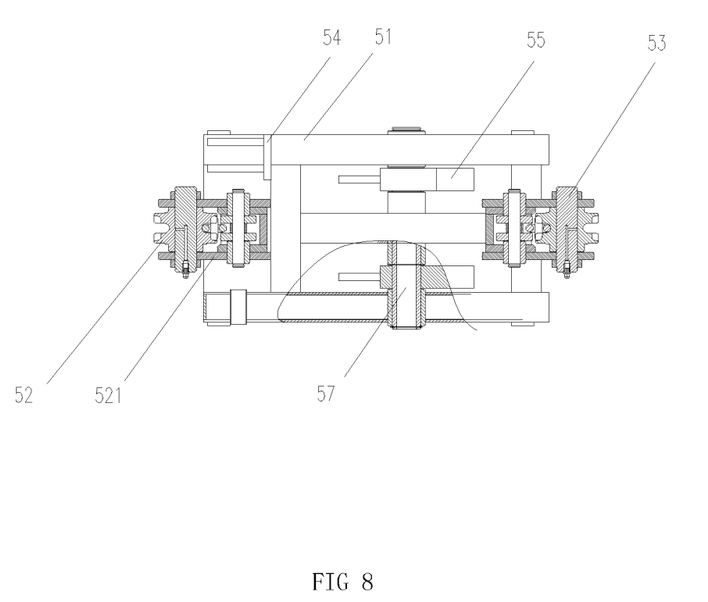
FIG. 8 is a plan view of a towing hook device according to Embodiment 1 of the invention.

As shown in FIGS. 7 and 8, a bracket 51 is a frame body formed by welded rectangle-shaped pipe material, and an installation gap is opened and mounted at the two ends of the bracket in axial direction. Two pairs of shaft holes are opened and mounted on one bracket bodies 521, and two pin shafts are mounted thereon. A left sprocket 52 is sleeved on one pin shaft being outwards, and a guide-chain roller is sleeved on the other pin shaft and forms a guide-chain mechanism, and then the bracket 521 is welded at installed gap at the left end thereof. The right sprocket 53 and the left sprocket 602 are similarly designed and welded at the installed gap at the right end thereof. The upper end surface of the bracket 51 protrudes axially and is welded with a front towing hook 54. The bracket 51 can be a retention plate and also can be two retention protruding blocks. A back towing hook shaft 57 is longitudinally mounted in a shaft hole opened and mounted on the bracket 51 and is fixed with a shaft retention ring. Two back towing hooks 55 are sleeved on the back towing hook shaft 57.

Figure 9:
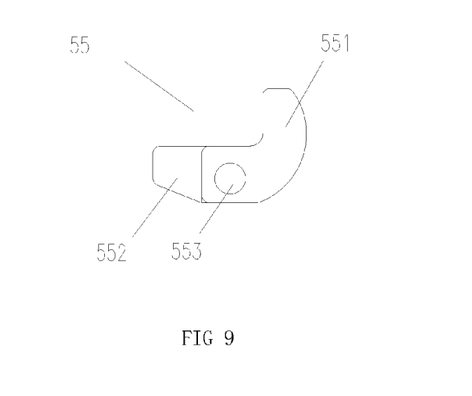
FIG. 9 is a front view of a back towing hook according to the invention.

As shown in FIG. 9, an upper shift arm 551 and a lower shift arm 552 are fixedly connected into L-shape. A back towing hook shaft hole 553 is opened and mounted on the lower shift arm 552 and hence constitutes a back towing hook 55, With such design, the back towing hook 55 is overturned automatically along the back towing hook shaft under its gravity. That is, when a support surface of back towing hook guide rails 60 is mounted below the back towing hook 55 or below other obstacles; the lower shift arm 552 is upwards, and the upper shift arm 551 is overturned below. The distance between the front towing hook 54 and the back towing hook 55 is matched with the width of a safety beam of a dustbin. That is, when the safety beam reaches the front towing hook 54, the radial width of the safety beam at least can press the lower shift arm 552, and facilitates the back towing hook 55 not to be overturned, which is very important. If the safety beam is positioned between the front and the back towing hooks 54 and 55, its radial width cannot press the lower shift arm 552, and the back towing hook 55 will be under overturned state. When the dustbin is pulled out of the towing hook device 50, the safety beam will be against the downward side of the lower shift arm 552, so as to force the back towing hook 55 to be overturned in clockwise. When the relatively thick part of a towing hook shaft hole 553 close to one downward side of the lower shift arm 552 is overturned, a protruding block will be formed and the safety beam will exit.

Figure 10:
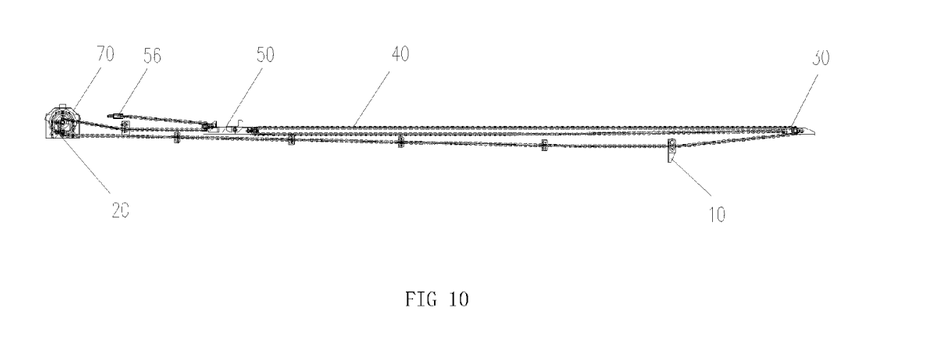
FIG. 10 is a diagram of a winding method of a transmission chain according to Embodiment 1 of the invention.
Figure 11:
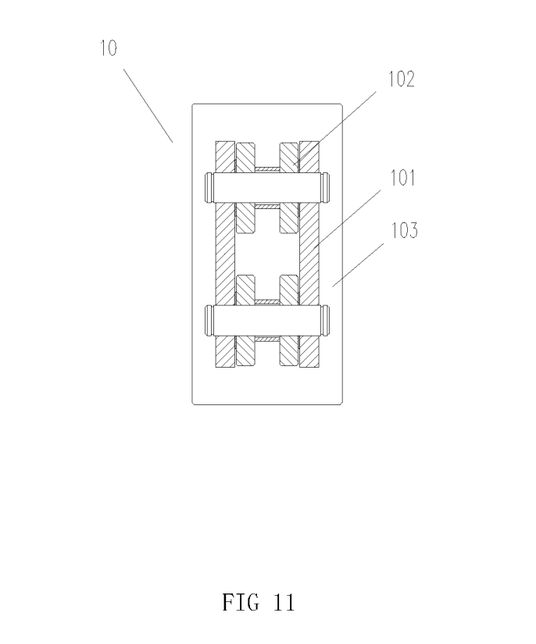
FIG. 11 is a structure diagram of guide wheels according to the invention.

As shown in FIG. 10, one end of a tensioner 56 is welded with a bolt base, and the other end thereof is fixed on a frame 1 close to one side of a motor 70. The free end of the transmission chain 40 is inserted into and fixedly connected with the bolt base of the tensioner 56, winds a left sprocket 52, and extends and winds a drive sprocket 20. A subsidiary sprocket 24 forms a bending, is passed through the lower end of a towing hook device 50, winds a driven sprocket 30, continues to extend and wind a right sprocket 53, is retraced and inserted into one end of the driven sprocket 30, and is welded on and fixedly connected with the bolt base. In order to prevent a transmission chain 40 from skipping and tying a knot, a plurality of guide wheels used for restricting the transmission chain 5 are welded at the H-shaped beam along its moving direction. As shown in FIG. 11, two guide-wheel lateral plates 101 are welded on a guide-wheel base plate and constitutes a support frame. Two pairs of shaft holes are opened and mounted on the guide-wheel lateral plate 101, and two pin shafts are mounted thereon. Two guide chain rollers 102 are sleeved thereon respectively. The transmission chain 40 is passed through a through hole opened and mounted on a guide-wheel base plate 103 and is restricted between the two guide chain rollers 102.

The embodiment is designed with full consideration of the characteristics of the very heavy dustbin and its difficult movement. Compared with other embodiments, a towing hook device 50 of this embodiment is mounted with two sprockets at the left and the right ends thereof, which has pulley effect and facilitates the transmission chain 40 to wind and form a double-chain structure. Therefore, the dustbin can be towed more stably, with labor saving, improved structure strength of the device, and more safety.

Embodiment 2

Figure 12:
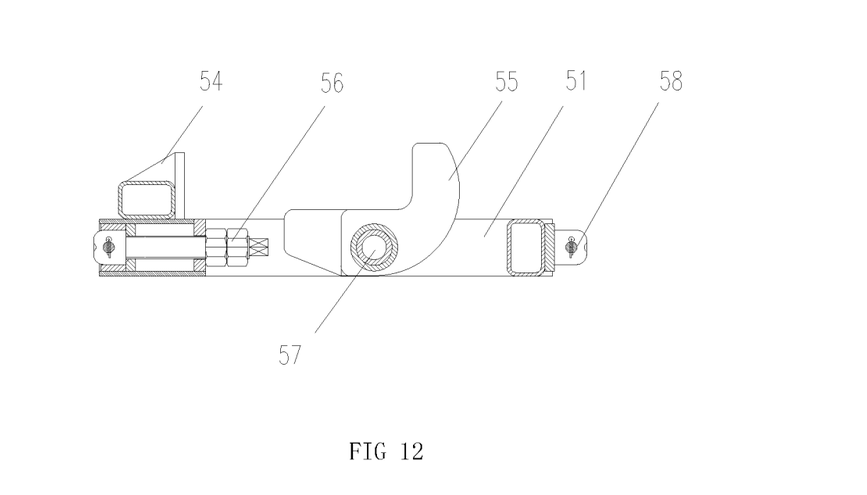
FIG. 12 is a front view of a towing hook device according to Embodiment 2 of the invention.
Figure 13:
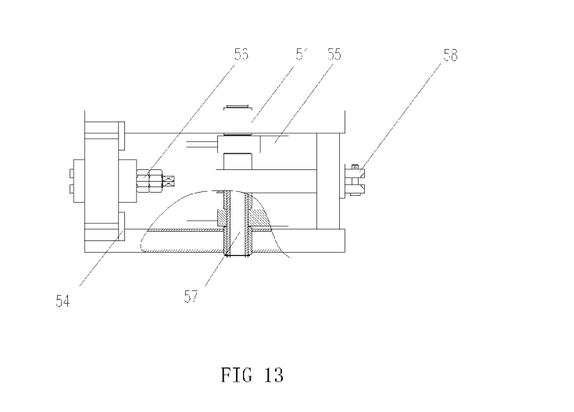
FIG. 13 is a plan view of a towing hook device according to Embodiment 2 of the invention.

As shown in FIGS. 12 and 13, compared with Embodiment 1, the main difference of this embodiment is the different design of the towing hook device 50. The tensioner 56 is welded in an installation gap of the axial left end of a bracket 51 and used for fixed connection with one free end of a transmission chain 40. The installation gap of the axial right end of the bracket 51 is welded with one bolt base 58 and used for fixed connection with the other end of the transmission chain 40. The remaining design of this embodiment is the same with that of Embodiment 1.

Figure 14:
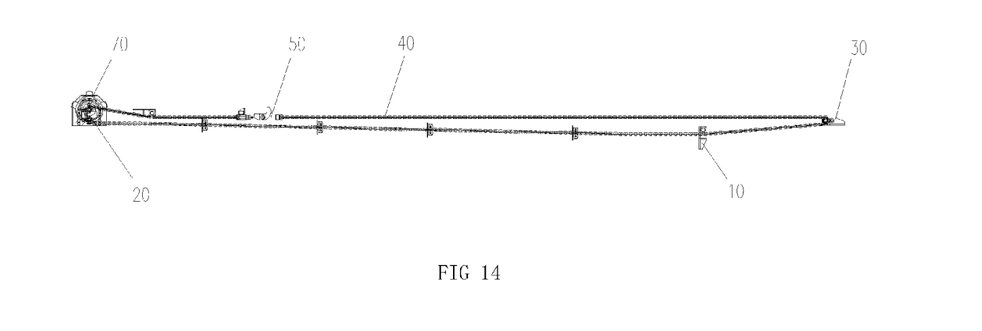
FIG. 14 is a diagram of a winding method of a transmission chain according to Embodiment 2 of the invention.

As shown in FIG. 14, the free end of the transmission chain 40 is fixedly connected with a bolt base welded with the end of the tensioner 56 and winds a drive sprocket 20. A subsidiary sprocket 24 forms a bending, is passed through the lower end of a towing hook device 50, winds a driven sprocket 30, finally extends and reaches the right end of a bracket 51, is inserted into a bolt base 58 and fixed with a bolt pin.

Obviously, a towing hook device 50 of this embodiment is fixedly connected with a free end of a transmission chain 40 at two ends thereof axially, thereby causing the winding method of the transmission chain 40 to be changed. Compared with the characteristics of other embodiments, the transmission chain 40 of this embodiment winds and forms a single chain structure, with simple integral structure, easy assembly and cost saving.

Embodiment 3

Figure 15:
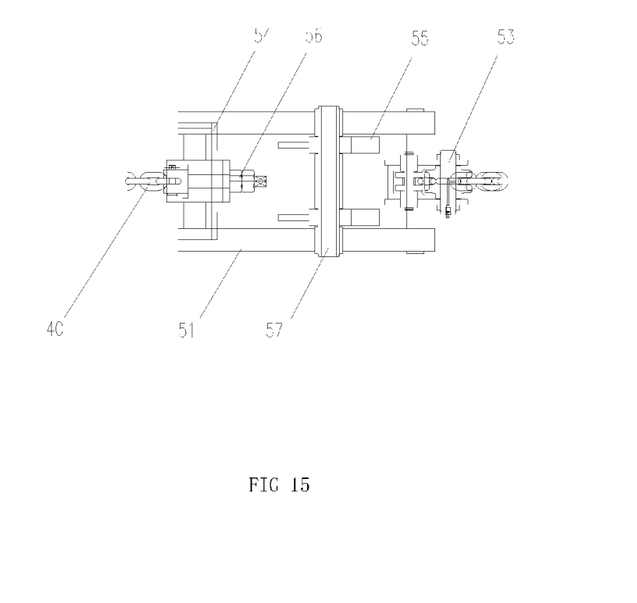
FIG. 15 is a structure diagram of a towing hook device under overlooking state according to Embodiment 3 of the invention.

As shown in FIG. 15, compared with Embodiment 1 and Embodiment 2, this embodiment has main design difference:

A tensioner 56 of Embodiment 2 is welded in an installation gap of the left end of a bracket 51. The installation gap of the right end of the bracket 51 is welded with a right sprocket 53 of Embodiment 1. The remaining design of this embodiment is the same with that of Embodiment 1.

Figure 16:
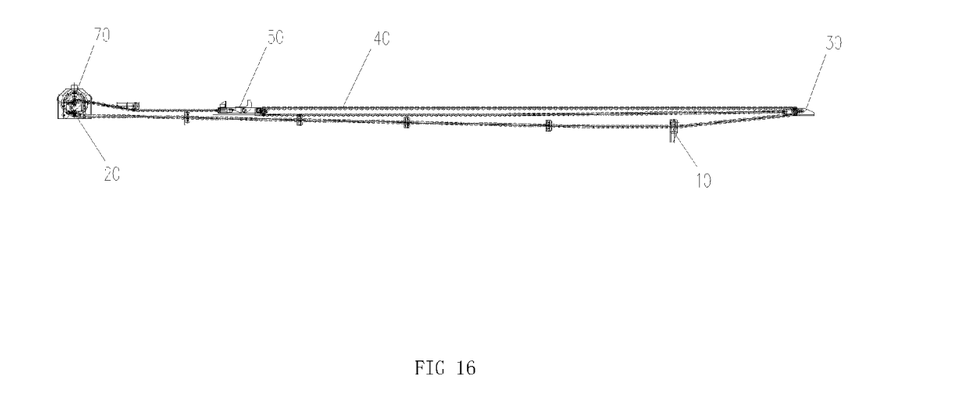
FIG. 16 is a diagram of a winding method of a transmission chain according to Embodiment 3 of the invention.

As shown in FIG. 16, the free end of the transmission chain 40 is fixedly connected with a bolt base welded with the end of the tensioner 56 and then winds a drive transmission 20. A subsidiary sprocket 24 forms a bending, is passed through the lower end of a towing hook device 50, winds a driven sprocket 30, continues to extend and wind the right end of a right sprocket 53, is retraced to and fixedly connected with a bolt base welded with one end of the driven sprocket 30.

The design changes of the towing hook device 50 of this embodiment cause the winding method of a transmission chain 40 to be changed, and a right sprocket 53 has pulley effect. Compared with Embodiment 2, the transmission chain 40 winds at the right side of the device and forms a double-chain structure. Therefore, compared with embodiment 2, the dustbin can be towed more stably, with labor saving, improved structure strength of the device, and more safety.

Embodiment 4

Figure 17:
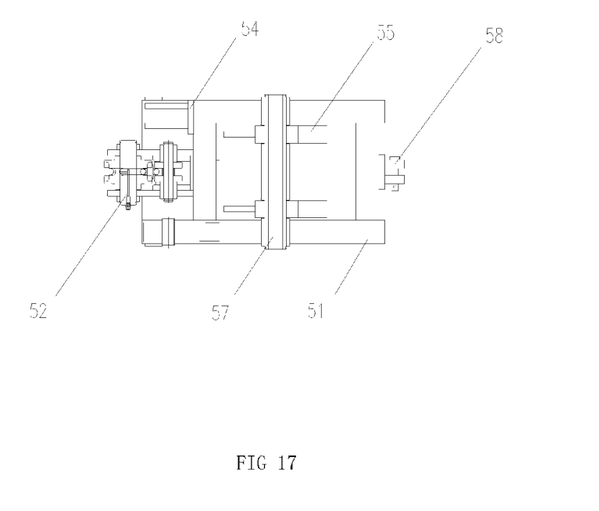
FIG. 17 is a structure diagram of a towing hook device under overlooking state according to Embodiment 4 of the invention.

As shown in FIG. 17, compared with Embodiments 1, 2 and 3, this embodiment has main difference that: An installation gap at the left end of a bracket 51 in the axial direction is welded with one left sprocket 52 of Embodiment 1, and a right end thereof is welded with a bolt base 58 as described in Embodiment 2. The remaining design of this embodiment is the same with that of Embodiment 1.

Figure 18:
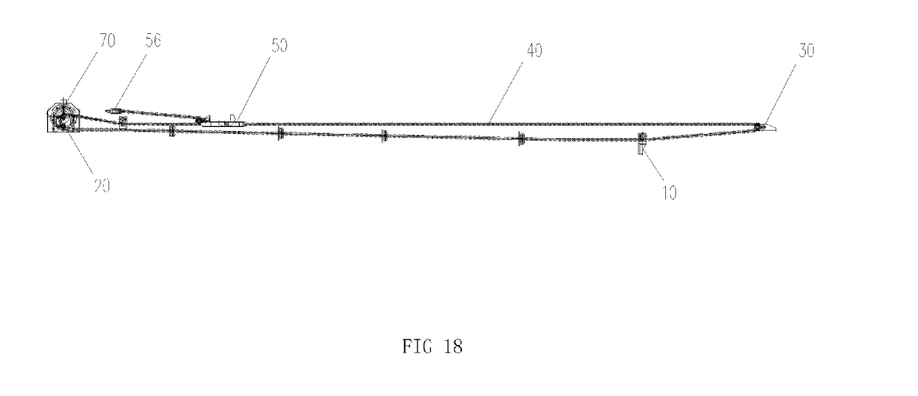
FIG. 18 is a diagram of a winding method of a transmission chain according to Embodiment 4 of the invention.

As shown in FIG. 18, a tensioner 56 is fixedly connected with one side of a frame 1 close to a drive sprocket 20 as described in Embodiment 1. A free end of a transmission chain 40 is fixedly connected with a bolt base welded on the tensioner 56, hence winds a left sprocket 52 and is retraced and winds a drive sprocket 20. A subsidiary sprocket 24 forms a bending, is passed through the lower end of a towing hook device 50, winds a driven sprocket 30, continuously extends and is inserted into and fixedly connected with a bolt base of the right end of a bracket 51.

The design changes of the towing hook device 50 of this embodiment cause the winding method of a transmission chain 40 to be changed, and a left sprocket 52 has pulley effect. The transmission chain 40 is facilitated to form a double-chain structure at the left side of a device. Therefore, compared with Embodiment 2, the dustbin can be towed more stably, with labor saving, partially improved structure strength of the device, and more safety.

The transmission chain 40 of the invention adopts a double-ring type chain and a sprocket matched therewith. Other flexible members, which are used for transmission or towing and consist of rigid members, can replace a double-ring chain only if matched with suitable chains, for example, a tooth-shaped row-type chain, a roller chain, a bushed chain, a towing chain, etc.

The abovementioned involves several preferred embodiments. Compared with the prior art, a semi-trailer vehicle of a long frame is axially provided with a towing device consisting of a towing a drive sprocket, a driven sprocket, a towing hook, a transmission chain, a motor and towing hook guide rails. The towing device is matched with a rolling chute, solving the problem that a dustbin moves on a frame, and utilizing a transit vehicle as a loading tool and an unloading tool to load and unload two vertical type garbage containers or the like stowage. Therefore, not only its cost is saved but also traffic safety requirements are met while transport efficiency is improved.

A traction pin 15 is welded at a gooseneck of the front end of a frame of the invention and used for connecting with a motor headstock. A travelling mechanism is provided again to be assembled into a semi-trailer transport vehicle used for transporting two vertical type garbage containers or the like stowage.

The invention works usually through the following steps:

When loading and unloading a dustbin, hydraulic fluid is firstly input into an oil motor to drive a drive sprocket 20 through utilizing an external oil pump (not shown). A transmission chain 40 tows a towing hook device 50 along towing hook rails 60, moves towards a driven sprocket 30 and meets a stroke switch 80, and the oil motor 70 stops working. The towing hook device 50 stops, and usually, this place is at the maximum stroke of a towing hook device 50 or the stroke of the predetermined stop. At this time, two back towing hooks 55 are just placed on a hook-avoidance groove 61 so that they can be overturned. The rear of a transit vehicle of a first loaded dustbin and the rear of a frame 1 are in butt joint. A turnover mechanism of a transit vehicle lifts the dustbin and forms an included angle with a horizontal plane. The dustbin is facilitated to be slidden into a rolling chute 11. The transit vehicle moves forwards. The dustbin is lowered to facilitate two hooks at the rear of a frame 1 to hook the safety beam below the dustbin. The transit vehicle continues to move forwards. The turnover mechanism is lowered and facilitates the dustbin to be in parallel with the rolling chute 11. The transit vehicle backs and pushes the dustbin along the rolling chute 11 into the frame 1 until the safety beam is against a lower shift arm 552. An upper shift arm 551 is overturned under the press of the safety beam until the safety beam enters the place between a front and a back towing hooks 54 and 55. The transit vehicle leaves and the oil motor 70 is overturned. The upper and the lower shift arms 551 and 552 get the safety beam stuck, tows the dustbin to move towards the frame 1 until they meet a retention device 14. At this time, the dustbin touches the other stroke switch 80; the oil motor stops working, and then the towing device 50 stops. The transit vehicle loading the second dustbin repeats the actions of the first dustbin, pushes the dustbin into the rolling chute 11 and meets the first dustbin.

When the dustbin is unloaded, the rears of the transit vehicle and the frame 1 are in butt joint. The traction mechanism of the transit vehicle pulls the second dustbin into the transit vehicle to be transported away. The oil motor 70 is launched. The front hook 54 is against the safety beam and tows the dustbin to move toward the frame 1 until arriving the maximum stroke or the stroke of the predetermined stop of the towing hook device 50. The stroke switch 80 is touched again. The oil motor 70 is controlled to stop turnover. The rears of the transit and the frame 1 are in butt joint. The first dustbin is pulled into the transit vehicle to be transported away.

The invention claimed is:

1. A frame assembly for two movable stowage devices, comprises:
    a frame (1);
    a rolling chute (11) which is axisymmetrically arranged on the frame (1), being characterized by further comprising:
    a drive sprocket and a driven sprocket (30) which are axially mounted on the frame (1);
    a transmission chain (40) which is meshed with the drive sprocket (20) and the driven sprocket (30), respectively;
    a towing hook device (50) which is mounted between the drive sprocket (20) and the driven sprocket (30) and towed by the transmission chain (40);
    a motor 70;
    a towing guide rails 60;
    a stroke switch 80;
    a hook 13;
    a retention device 14;
    a pneumatic locking device 16;
    and a traction pin 15;
    wherein the frame 1 is a frame body constituted by an H-shaped beam mounted between a stomach-type H-shaped beam at two sides thereof and the stomach-type H-shaped beam in parallel; the length of the frame body equals at least the length of two dustbins; two protruding hooks 13 are fixed at the H-shaped beam at the rear of the frame 1 that are used for hooking a safety beam of the dustbin; a retention device 14 is fixed at the H-shaped beam of the front end of the frame 1 and used for positioning a first dustbin; a plurality of rolling wheels are welded at the H-shaped beam symmetrically, and constitutes a rolling chute 2 distributed at the frame 1 axisymmetrically, that are used for forming stroke of the dustbin; four pneumatic locking devices 16 are respectively welded at the lateral wall of the stomach-type H-shaped beam that are used for transporting a locked dustbin on the way; the two stroke switches 80 are respectively mounted at the side close to the retention device 14; and the driven sprocket 30 is controlled by the motor 70;
    wherein the towing hook device (50) comprises a bracket (51), a left sprocket (52), a right sprocket (53), a front towing hook (54) and a back towing hook (55); the left and the right sprockets (52, 53) are axially mounted at two ends of the bracket (51), and the front towing hook (54) is bulgingly mounted on the bracket (51) closed to the end of the left sprocket (52).

2. The frame assembly according to claim 1, wherein the towing hook guide-rail (60) is axially mounted on the frame (1) and fitted with the towing hook device (50), which is used to be as a moving guide-rail for the towing hook device (50).

3. The frame assembly according to claim 1, wherein the frame assembly further comprises a tensioner (56) being mounted on the frame (1) and fixedly connected with one end of the transmission chain (40).

4. The frame assembly according to claim 1, wherein the drive sprocket (20) further comprises a transmission shaft (22) and a subsidiary sprocket (24); and the subsidiary sprocket (24) is mounted under the drive sprocket (20).

5. The frame assembly according to claim 1, wherein the subsidiary sprocket (30) further comprises two subsidiary lateral plates (31); the two subsidiary lateral plates (31) are symmetrically mounted to be as a supporting frame; the subsidiary sprocket (30) is mounted between the two subsidiary lateral plates.

6. The frame assembly according to claim 1, wherein the towing hook device (50) further comprises a back towing hook shaft (57); the back towing hook shaft (57) is horizontally sleeved on a bracket (51).

7. The frame assembly according to claim 6, wherein a back towing hook (55) comprises an upper shift arm (551), a lower shift arm (552) and a back towing shaft hole (553); the upper and the lower shift arms (551,552) are fixedly connected into L-shape, and the back towing hook shaft hole (553) is made on the lower shift arm (552).

8. The frame assembly according to claim 2, wherein a towing hook guide-rails (60) consists of two smooth long angle steels being paralleled, and a hook-avoidance groove (61) between the two towing hook guide-rails is made by predetermined stroke of a towing device (50).

9. The frame assembly according to claim 1, wherein the frame (1) further comprises guide wheels (10) which comprise guide-wheel lateral plates (101) and chain guide rollers (102); the guide-wheel lateral plates (101) are mounted in parallel to act as a support role, and two chain guide rollers (102) are mounted between the guide-wheel lateral plates.

10. The frame assembly according to claim 1, wherein the stroke switch (80) is used to control the operation of a motor (70) that is mounted on the frame.

* * * * *